United States Patent
Osterlanger et al.

(10) Patent No.: US 8,800,341 B2
(45) Date of Patent: Aug. 12, 2014

(54) BALL SCREW FOR PRODUCING A THREADED NUT OF A BALL SCREW DRIVE

(75) Inventors: Jurgen Osterlanger, Emskirchen (DE); Josef Miko, Emskirchen (DE); Manfred Kraus, Herzogenaurach (DE); Stefanie Barthlein, Baudenbach (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 287 days.

(21) Appl. No.: 13/377,922

(22) PCT Filed: Jul. 19, 2010

(86) PCT No.: PCT/EP2010/060446
§ 371 (c)(1),
(2), (4) Date: Dec. 13, 2011

(87) PCT Pub. No.: WO2011/018307
PCT Pub. Date: Feb. 17, 2011

(65) Prior Publication Data
US 2012/0085139 A1    Apr. 12, 2012

(30) Foreign Application Priority Data
Aug. 10, 2009   (DE) .......................... 10 2009 036 824

(51) Int. Cl.
| F16H 25/20 | (2006.01) |
| F16H 25/24 | (2006.01) |
| B21C 23/14 | (2006.01) |
| B21C 37/20 | (2006.01) |

(52) U.S. Cl.
USPC ................ 72/370.17; 72/370.21; 74/89.37; 192/141; 29/898.063

(58) Field of Classification Search
CPC ........ B12C 23/03; B12C 23/14; B12C 23/20; B12C 23/21; B12C 23/085; B12C 23/212; B12C 23/214; B12C 23/218; B12C 35/04; B12C 37/20
USPC .......... 72/254, 255, 370.17, 370.21; 74/89.37, 74/424.81; 192/141; 29/898.03, 898.063, 29/898.068
See application file for complete search history.

(56) References Cited

U.S. PATENT DOCUMENTS

| 2,944,436 | A |   | 7/1960 | Pickles |
| 3,923,089 | A | * | 12/1975 | Ladouceur ...................... 72/254 |
| 5,255,882 | A |   | 10/1993 | Schroppel |
| 6,334,370 | B1 | * | 1/2002 | Sonoda et al. ........... 29/898.066 |
| 2009/0283371 | A1 |   | 11/2009 | Winkler et al. |

FOREIGN PATENT DOCUMENTS

| DE | 19944876 | 3/2001 |
| DE | 102007046180 | 5/2008 |
| DE | 102007042654 | 3/2009 |
| EP | 0074922 | 3/1983 |
| FR | 2663414 | 12/1991 |
| JP | 2002250426 | 9/2002 |
| WO | 2008037738 | 4/2008 |

* cited by examiner

*Primary Examiner* — David B Jones
(74) *Attorney, Agent, or Firm* — Volpe and Koenig, P.C.

(57) ABSTRACT

A method for producing a threaded nut (10, 26) of a screw drive, in particular of a ball screw (7, 24), which threaded nut (10, 26) has, on one axial end, a recess (45) which extends over a circumferential segment and which is open at the end side, wherein said recess (45) is delimited radially by a circumferential wall of the threaded nut (10, 26), and wherein said recess (45) is delimited axially by a base (54) formed on the threaded nut (10, 26), and wherein said recess (45) is delimited in the circumferential direction by a stop surface (47), which is formed on the threaded nut (10, 26), for a projection (44), produced according to the following steps: a blank is deformed in a deformation process by deformation of material so as to form the recess (45), wherein the base (54) and the stop surface (47) and the circumferential wall are integrally connected to one another.

6 Claims, 8 Drawing Sheets

BALL SCREW FOR PRODUCING A THREADED NUT OF A BALL SCREW DRIVE

BACKGROUND

The present invention relates to a method for producing a threaded nut of a screw drive, in particular of a ball screw. Ball screws convert rotational movements into translatory movements.

DE 19944876 A1, for example, discloses an actuating device for a parking brake of a motor vehicle, in which actuating device a ball screw is provided.

The threaded spindle, which is driven by an electric motor, effects a relative axial displacement between the threaded nut and the threaded spindle, wherein the threaded nut, in its feed direction, exerts a pressure force on a friction pad of a disk brake via further machine parts. To release the parking brake, the threaded spindle is driven in the opposite rotational direction; the threaded nut travels back on the threaded spindle until it reaches a stop position in which a stop takes effect. The circumferential stop takes effect before the threaded nut can be axially braced with a stop part which is arranged on the threaded spindle and which has the projection.

In the ball screw application described here, a circumferential stop of said type is important for correct functioning of the ball screw. Without a circumferential stop of said type, it would undesirably be possible for the threaded nut to be axially braced in the manner of a tightened screw nut, and a release of said axial bracing action would be possible only by imparting a considerable torque.

In said known ball screw, the projections provided on the threaded nut and on the stop part must be coordinated with one another: before the final possible rotation between the threaded nut and the stop part, there must still be an axial spacing between the two projections sufficient to prevent these from abutting against one another at the end side. During the final rotation, the two projections overlap one another in the axial direction; the two projections finally circumferentially abut against one another, and a further relative rotation between the threaded spindle and the threaded nut is prevented.

The projection which is formed on the end side of the threaded nut is of solid form in order to be able to accommodate even large torques during the abutment of the threaded nut. To produce said projection provided on the end side, it is expedient for the ball nut to be produced in a cutting process.

DE 102007046180 discloses a similar actuating device. Here, too, a circumferential stop for the threaded nut is provided, which stop is formed as a stop surface formed on the inner circumference of the threaded nut. Said stop surface is formed on a pin which is fastened to the threaded nut.

SUMMARY

It was an object of the present invention to specify a method for producing a threaded nut of a ball screw, which can be produced economically in particular in large quantities.

This object is achieved by the method according to the invention. The method according to the invention for producing a threaded nut of a screw drive, in particular of a ball screw, provides that, on one axial end of the threaded nut, there is formed a recess which extends over a circumferential segment and which is open at the end side, wherein said recess is delimited radially by a circumferential wall of the threaded nut, and wherein said recess is delimited axially by a base formed on the threaded nut, and wherein said recess is delimited in the circumferential direction by a stop surface, which is formed on the threaded nut, for a projection. According to the invention, said threaded nut is produced according to the following steps: a blank is deformed in a deformation process by deformation of material so as to form the recess, wherein the base and the stop surface and the circumferential wall are integrally connected to one another.

The stop surface is expediently formed within the threaded nut. Pins or other additional components on which the stop surface is formed are dispensed with. The recess is provided with an integral wall. The non-cutting deformation process which is provided according to the invention for producing the recess offers economic advantages in particular in the case of large quantities owing to the short processing time.

As a result of the deformation, material flows so as to form the wall of the recess. For this purpose, said deformation process may take place in a die.

Cold extrusion is particularly suitable for the invention. According to DIN 8583, extrusion falls within the category of pressure forming. Massive forming permits the production of hollow and solid bodies by means of a single-stage or multistage production process. In said method, the material is caused to flow under the action of a high pressure. Here, a punch presses the workpiece blank through a die. According to the invention, it is possible in this way to produce the threaded nut with the recess.

Proposed as a further deformation variant preferred according to the invention is semi-hot forming. Semi-hot forming is carried out in a temperature range from 600° C. to 950° C. Semi-hot forming is characterized by high dimensional accuracy and surface quality, similarly to cold forming. Semi-hot forming permits the production of complex geometries, wherein the deformation forces can be lowered in relation to cold forming. Semi-hot forming is similar to a forging process and offers the advantages both of cold forming and also of hot forming.

Semi-hot forming permits very low material usage with a reduction in the further machining costs for complex geometries. For semi-hot forming, the prefabricated blanks may be inductively heated and deformed on vertical, in part multistage presses. In the method according to the invention, a solid blank may be inserted into a die and deformed therein; a punch may penetrate into the material of the blank; the displaced material flows under the acting forces against the negative form of the die, and takes on the form of the threaded nut according to the invention. The tubular form of the threaded nut can be generated already by the penetration of the punch into the solid blank.

The threaded nut produced in the manner according to the invention has, owing to its production, a very precisely manufactured stop surface. High dimensional accuracy for the stop surface is required in particular in connection with a circumferential stop for the threaded nut. This is because the axial overlap of the stop surface with a counterpart surface on a projection which engages into the threaded nut is dependent inter alia on the pitch of the threaded spindle, and may amount to only 1 mm or less. This means that the production tolerances on the stop surfaces should be very narrow and the contour should be formed with high precision.

Semi-hot forming meets these requirements. This is because in particular the formation of the stop surface can take place with high accuracy, wherein on account of the flow of the material, very small radii can be obtained at the edges of the stop surface. Small radii offer the advantage that the stop surface is available substantially without losses as a load-bearing surface.

In a further method step, a ball groove on which balls can roll may be produced, preferably by turning, on the inner circumference of the threaded nut. By the classification of production processes according to DIN 8580, turning falls within the category of cutting processes. In the case of thread turning, a tool is utilized in the longitudinal turning process. The feed may correspond to the thread pitch, the tool thereby leaving behind a track on the desired helical line. The ball groove can be produced after turning machining has been carried out repeatedly.

Thread chasing may be regarded as being a subcategory of thread turning. A tool for thread chasing has a plurality of cutting edges one behind the other. Each has the profile of the thread, and the spacing of the cutting edges corresponds to the pitch. The cutting edges are arranged with an offset, such that each runs slightly deeper in the track of its predecessor. For thread chasing, only a single pass is required, and the processing time can therefore be shortened considerably in relation to thread turning.

For an improvement in surface quality, it may be expedient to carry out so-called furrowing of the ball groove after the turning process. A type of screw is used as a tool for thread furrowing. As the screw is turned into the bore, a ball groove is furrowed into the material. Here, material is displaced in the bore of the workpiece, which material flows into the thread of the furrowing screw. No chips are formed, and improved strength of the ball groove can be obtained.

Tempering steels and case-hardening steels are expediently suitable for the method according to the invention. Case-hardening steels are easily deformable by extrusion—cold or semi-hot—owing to their low carbon content. After the shaping process, the threaded nut produced according to the invention may be hardened in a known way; in the case of case-hardening steel, case hardening is carried out.

Case hardening is to be understood to mean the carburization, hardening and annealing of a workpiece composed of steel with the aim of obtaining an increase in wear resistance by means of an increased surface layer hardness, obtaining an increase in load-bearing capacity, obtaining an improvement in bending strength by means of a ductile core, and obtaining an increase in fatigue strength.

BRIEF DESCRIPTION OF THE DRAWINGS

Two exemplary embodiments of the invention are illustrated in the drawing and will be described in more detail below. In the drawing.

DETAILED DESCRIPTION OF THE PREFERRED EMBODIMENTS

Figure 1:
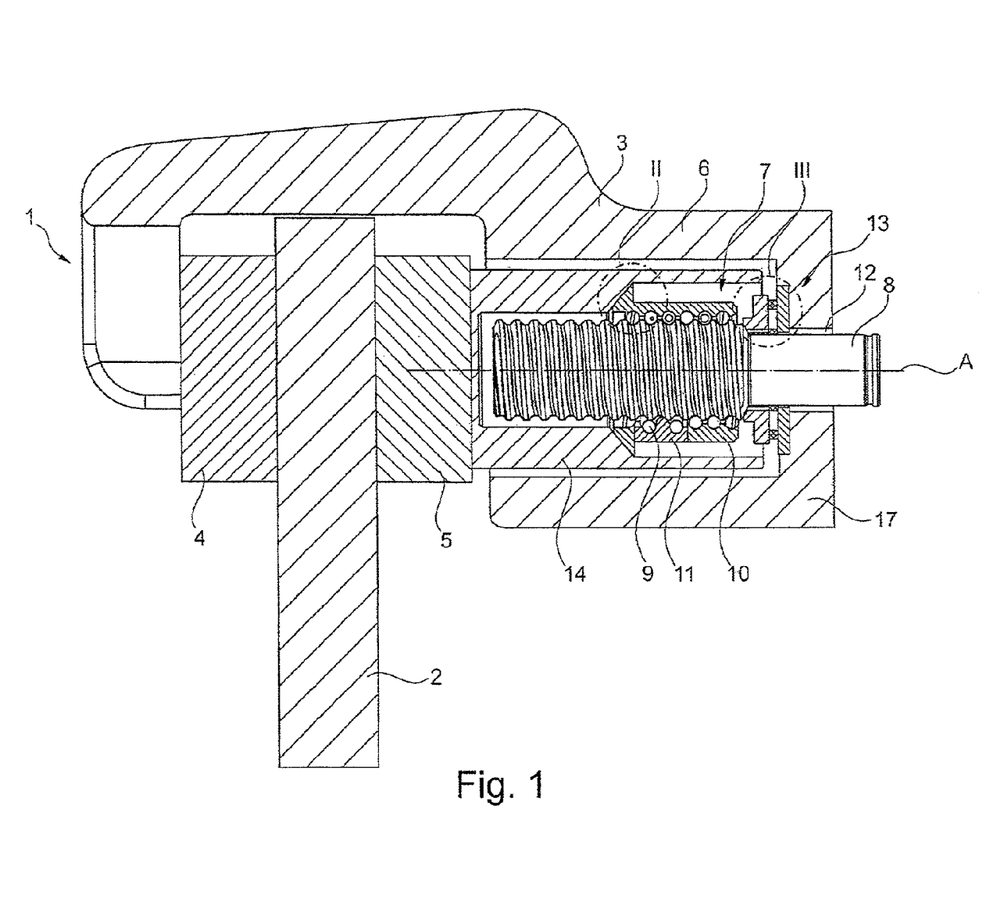
FIG. 1 shows a diagrammatic, sectional illustration of a brake device having a ball screw according to the invention in the unloaded state.

FIG. 1 shows a brake device 1 according to the invention of the type which may be implemented as a parking brake or immobilizing brake in a motor vehicle, for example. The brake device 1 comprises a brake disk 2, which is connected in a known way to the wheel, and a brake caliper 3 of substantially C-shaped cross section, which fits over the brake disk 2. Accommodated in said brake caliper are two brake pads 4, 5, which are positioned on both sides of the brake disk 2 arranged between them and, for the purpose of braking, bear firmly against the latter, clamping the brake disk between them. FIG. 1 shows the release position, that is to say when the brake disk 2 is not clamped and the brake disk 2 can rotate freely between the two brake pads 4, 5, even though these are resting directly against the brake disk for the sake of the illustration. In actual fact, there is a minimal gap between the brake disk 2 and the brake pads 4, 5, allowing free rotation in the release position.

FIG. 1 furthermore shows a ball screw 7 according to the invention, which is accommodated in a portion 6 of the brake caliper 3 that may be formed in the manner of a housing and which comprises a threaded spindle 8, on which a threaded nut 10 runs in a manner guided by balls 9, the balls 9 circulating continuously and being constantly returned by means of at least one ball return element 11. The spindle 8 is connected to a drive motor (not shown in any more detail here), which is preferably arranged in the region of the outside of the housing-like portion 6 and the output shaft of which is at an angle of 90°, for example, to the threaded spindle 8. The output shaft of said drive motor is coupled to the threaded spindle 8 by way of a cardan joint, which allows the threaded spindle 8 to be motor-driven. The threaded spindle 8 is furthermore rotatably mounted in a fixed position on the brake caliper 3 by means of a radial bearing 12 and an axial bearing 13, in the present case in the form of a needle-roller bearing.

The threaded nut 10, for its part, is coupled to a piston 14, and the said piston rests on the front end edge of the threaded nut 10, that is to say is supported there. The movable brake pad 5 is arranged on the piston 14. If the drive motor (not shown in any more detail) is now activated, by actuation of a suitable actuating element on the vehicle, in order to actuate the brake device and hence to fix the brake disk 2, the threaded spindle 8 is moved by the drive motor and rotates, with the result that the threaded nut 10 travels along the threaded spindle 8, being guided by the balls 9 in the process, that is to say moves to the left in FIG. 1. During this process, the piston 14 seated on the end face of the threaded nut 10, and together with it the brake pad 5, is pushed to the left, with the result that it is brought firmly into contact with the brake disk, which is supported against the other brake pad 4, whereby the said brake disk is fixed between the two brake pads 4, 5.

Figure 2:
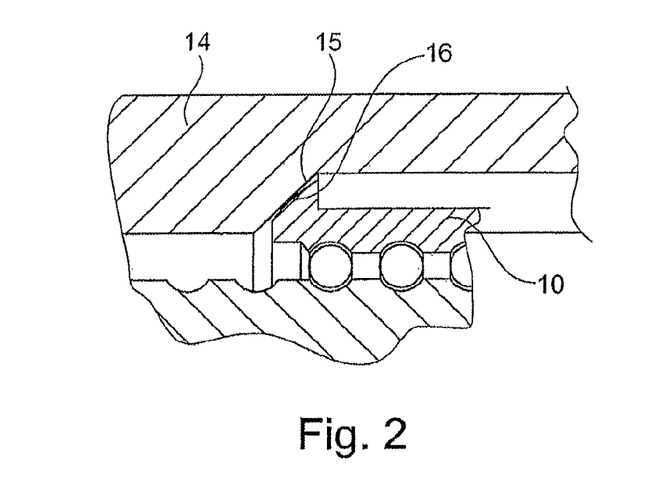
FIG. 2 shows an enlarged detail view of the region II from FIG. 1.

FIG. 2 shows on an enlarged scale a detail view of the seating region of the piston 14 on the threaded nut 10. The piston 14 has a conical guide surface 15, opposite which is a second guide surface 16 on the end of the threaded nut 10, the said second guide surface likewise being conical in terms of its basic shape but having a crowned or convex external form. This means that there is no extensive contact here but only linear bearing of guide surface 15 on guide surface 16. The effect is that the piston 14 is seated in a movable fashion on the nut 10, that is to say guide surface 15 can move on guide surface 16 owing to the linear support. The piston 14 can therefore tilt relative to the threaded nut 10 and a movable bearing arrangement is achieved, with lubrication by means of a suitable lubricant to reduce friction.

Figure 3:
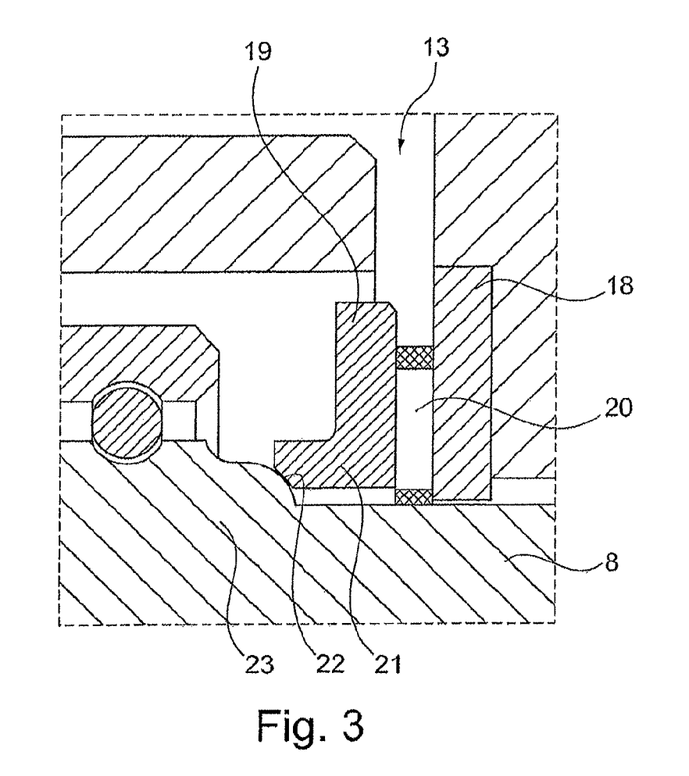
FIG. 3 shows an enlarged detail view of the region III from FIGS. 1.

As FIG. 3 shows in an enlarged detail view, a bearing arrangement which is likewise movable is achieved in the region of support of the threaded spindle 8 on the brake caliper 3. As explained, the threaded spindle 8 is supported on the wall 17 of the brake caliper, on the one hand radially by means of the radial bearing 12 and, on the other hand, by means of the axial bearing 13. This axial bearing comprises a first bearing disk 18 (housing disk), which is arranged in a fixed position on the wall 17, and a second bearing disk 19 (shaft disk), which runs on the first bearing disk 18 by way of needle rolling bodies 20. Bearing disk 19 has an axial projection 21, which has a conical second bearing surface 22 that, like guide surface 16 in the arrangement for supporting the piston 14 on the threaded nut 10, has a crowned convex surface with a basic shape that is preferably substantially conical.

The threaded spindle 8, for its part, has a first, convex bearing surface 23. It is therefore evident in this case also that a movable bearing arrangement is achieved since, here too, the first bearing surface 23 rests on the second bearing surface 22 only along a line but not over an area. The effect is that the threaded spindle 8 can tilt slightly relative to the positionally fixed axial bearing 13, specifically relative to the positionally fixed bearing disk 19, lubrication likewise being provided. This tilting is made possible by the fact that the threaded spindle 8 is likewise accommodated with a certain play in the radial bearing 12, or the radial bearing, a plastic plain bearing for example, allows a certain tilting. During operation, when the caliper expands owing to the forces that are acting, the tilt angle is in a range of significantly <0.5° per movable bearing location and, as a result, the plain bearing 12 is not subjected to significant loads.

Of course, it is possible with both bearing locations to implement the crowning on the respective other guide surface or to make both guide surfaces crowned.

Thus, in the brake device 1 according to the invention, two movable bearing locations are implemented, namely in the region of the seating of the piston 14 on the nut 10 on the one hand, and in the region of the seating of the threaded spindle 8 on the axial bearing 13 on the other hand. The effect is then that tilting of the relevant axes, which is present in known brake devices and results in high bearing loads that can lead to premature bearing failure, can be compensated to a large extent, thus making it possible to significantly reduce bearing loads.

In the unloaded position shown in FIG. 1, the three longitudinal axes of the threaded spindle 8, the brake caliper 3 or, more specifically, the preferably cylindrical housing-like portion 6, and the piston 14 coincide and are denoted in this Figure as a common axis with the letter A.

Figure 4:
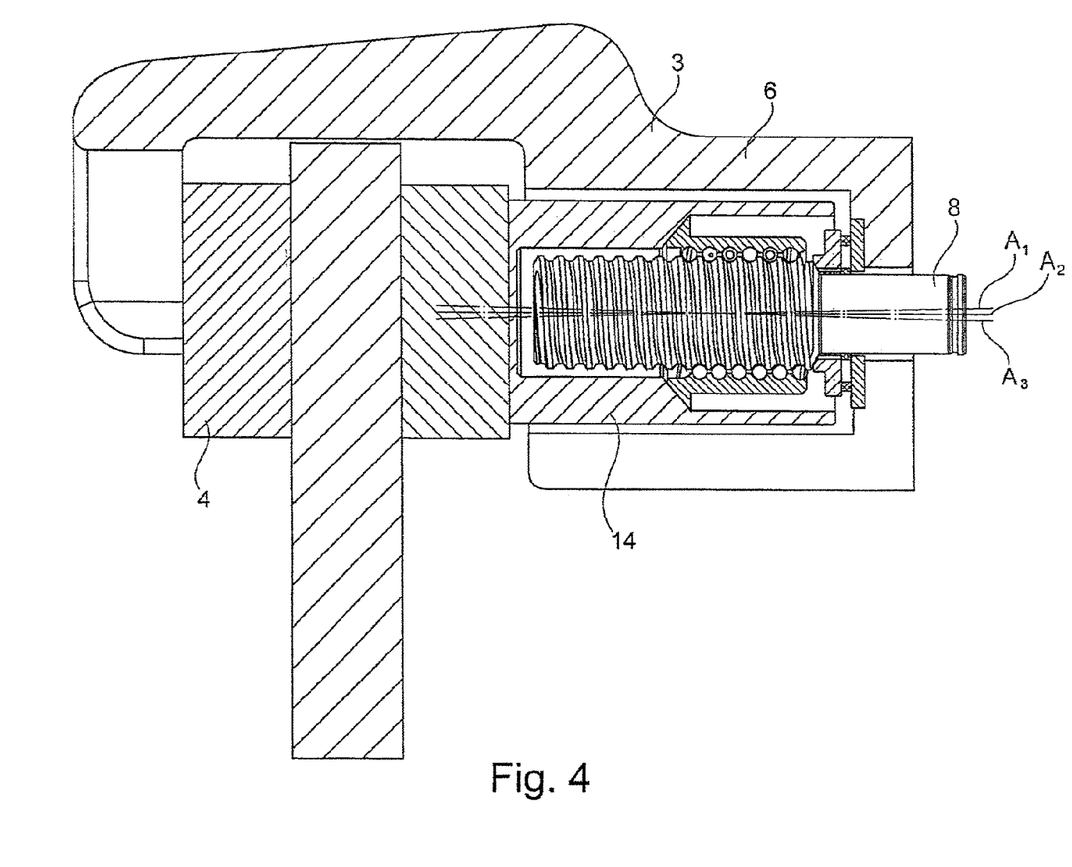
FIG. 4 shows the brake device from FIG. 1 in the loaded state with elements tilted relative to one another.

If the motor (not shown) is now used to activate the threaded spindle 8 and, by means of the latter, the piston 14 and with it the brake pad 5 is pressed against the brake disk 2, the brake caliper 3 is expanded or spread apart to a greater or lesser extent, depending on the contact force, as shown in FIG. 4. As can be seen, the brake caliper 3 expands and, on the one hand, a slight gap 24 is formed in the region of brake caliper contact with the first brake pad 4, and, as can also clearly be seen, portion 6 of the brake caliper 3 adopts an angled position relative to the piston 14. At this point, it should be pointed out that FIG. 4 shows a significantly exaggerated expansion and tilting of components compared with that which occurs in reality, this being for the sake of illustration.

By virtue of the two separate instances of mobility or movable bearing arrangements that are implemented, however, this severe angular offset can be effectively split up and the load acting on the axial bearing can be significantly reduced. This is because, on the one hand, the tilting of the brake caliper 3, that is to say its spreading apart, has the effect that the piston 14 tilts slightly relative to the nut 10, this being obtained by means of the movable seating of the piston 14 on the nut 10 via the guide surfaces 15, 16, as shown in detail in FIG. 2. In the same way, there is slight tilting of the seating of the threaded spindle 8 on the axial bearing 13 or bearing disk 19 by virtue of the movable bearing arrangement implemented there, as shown in FIG. 3. Here too, there is therefore an albeit slight relative movement or tilting movement. That is to say that the piston 14, the threaded nut 10, the threaded spindle 8, and the axial bearing 13 or bearing disk 19 consequently adjust relative to one another in pairs under the effect of load and consequently there is splitting and hence, at the same time, a local reduction of the individual tilt angles. The movement of the axial bearing 13 relative to the threaded spindle 8 also has the effect that the threaded spindle 8 moves or tilts relative to the radial bearing 12, as is likewise illustrated in FIG. 4. While all the longitudinal axes coincide in FIG. 1 as described, there is now an axial offset owing to the expansion of the brake caliper, but this is significantly less owing to the instances of mobility achieved than it would be with a rigid bearing arrangement. As can be seen, the individual axes $A_1$ of the brake caliper 3, $A_2$ of the ball screw 7 or threaded spindle 8, and $A_3$ of the piston 14 no longer coincide, but the respective axial offset is nevertheless relatively small. The maximum skewing or tilting of about 0.5° of the brake caliper axis relative to the normal to the brake disk which occurs in actual operating conditions can be well compensated by the decoupling of the elements which is provided for by the invention, that is to say by their mobility relative to one another, with the result that, overall, either the ball screw can be constructed with somewhat smaller dimensions and/or the service life of the bearings increases significantly.

FIGS. 5 to 11 show a further brake device having a ball screw 24 according to the invention. In this arrangement, the invention may also be referred to as an actuating device for a parking brake.

Where components illustrated here correspond to those of the exemplary embodiment described above, the same reference numerals are used.

Figure 5:
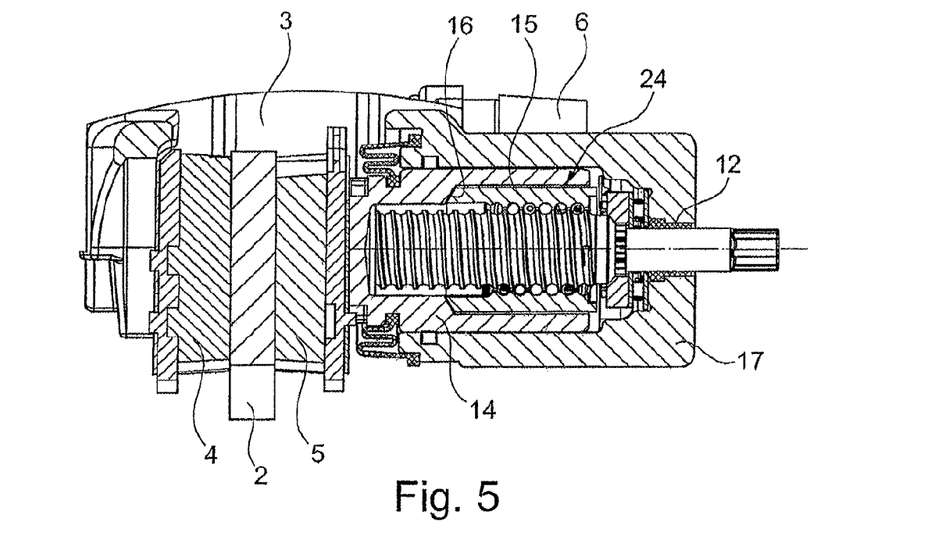
FIG. 5 shows, in section, a further brake device having a ball screw according to the invention.

FIG. 5 shows, in section, a parking brake or immobilizing brake having the ball screw 24 according to the invention. Here, an axial bearing 25 is provided which is modified in relation to the preceding exemplary embodiment.

Figure 6:
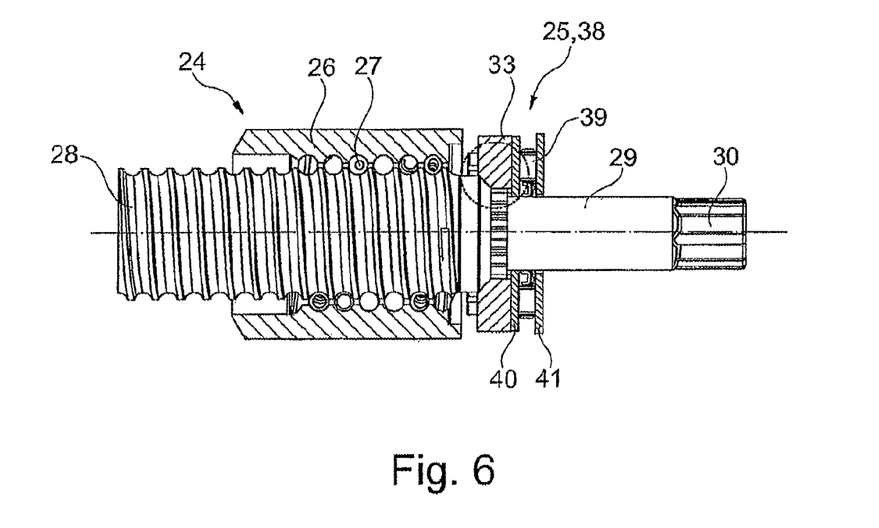
FIG. 6 shows the ball screw from FIG. 5.

The ball screw 24 according to the invention with the axial bearing 25 is shown clearly in section in FIG. 6. A threaded nut 26 is mounted in a rolling fashion on a threaded spindle 28 in a known way by means of balls 27. The threaded spindle 28 has, outside its portion which interacts with the threaded nut 26, a radially stepped spindle portion 29 which is provided, on the axial end thereof, with a polygon 30. A gearing (not shown here) may be connected at the drive output side to said polygon 30.

FIG. 6 also shows that the threaded spindle 28 is guided with its spindle portion 29 through the axial bearing 25. The axial bearing 25 comprises a support disk 33 and an axial rolling bearing 38 in which rollers 39 are arranged between two bearing disks 40, 41. One bearing disk 40 bears against the support disk 33, and the other bearing disk 41 is supported against the housing-side portion 6.

Figure 7:
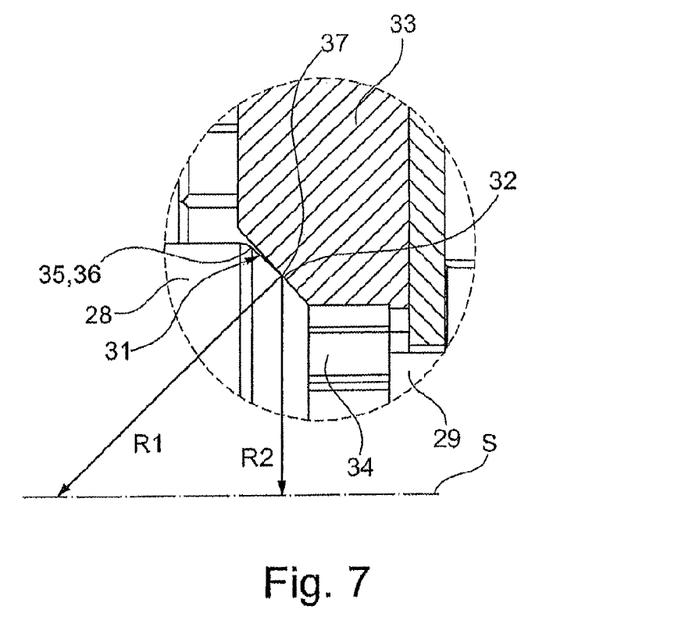
FIG. 7 shows an enlarged detail from FIG. 6.

FIG. 7 shows an enlarged detail of the ball screw 24 and of the axial bearing 25. The threaded spindle 28 is provided with a shoulder 31 at the transition to the radially recessed spindle portion 29. Said shoulder 31 has a bearing surface 32 which is convexly shaped with a radius of curvature. A support disk 33 of the axial bearing 25 is arranged on the threaded spindle 28 for conjoint rotation therewith, but such that it can perform a wobbling motion, via a toothing 34. The support disk 33 is provided, on its end side facing toward the first bearing surface 32, with a conical opening 35 which forms a second bearing surface 36.

The spindle axis S is indicated in FIG. 7. The radius of curvature R1 of the first bearing surface 32 intersects the spindle axis S. The two bearing surfaces 32, 36 make contact with one another along an annular contact path 37, the central point of which likewise lies on the spindle axis S. Said annular contact path 37 has a radius R2. It can be seen from FIG. 7 that the two radii R1 and R2 are arranged spaced apart from one another on the spindle axis S. The radius R1 is larger than the radius R2, wherein according to the invention, a quotient formed from the ratio of the radius R1 to the radius R2 assumes values between 1.4 and 1.6 inclusive. A circle drawn with the radius of curvature R1 lies in the plane of the page. A circle drawn with the radius of curvature R2 lies in a plane arranged perpendicular to the plane of the page.

Figure 8:
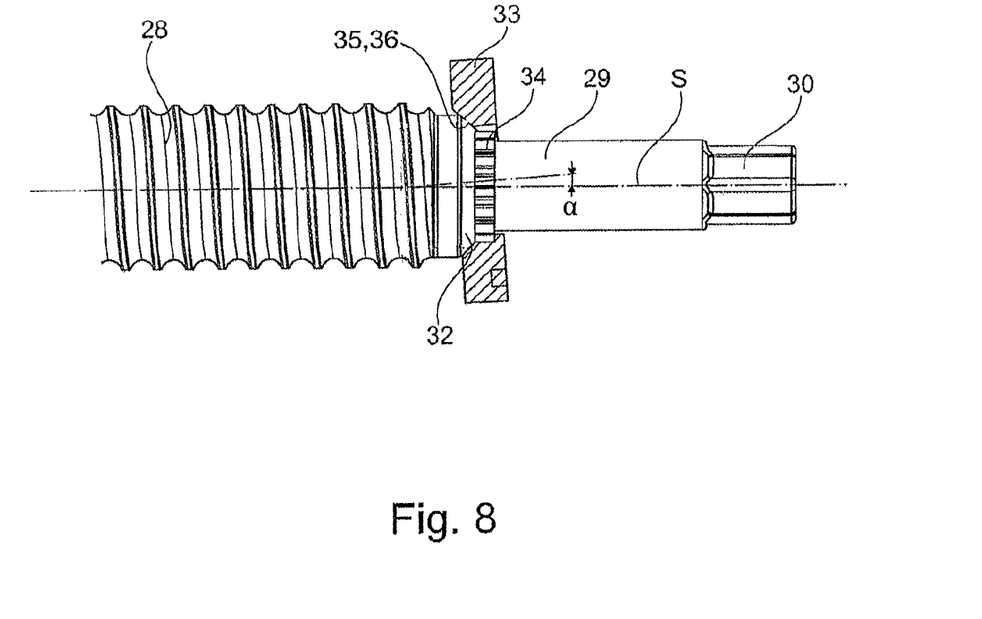
FIG. 8 shows individual parts of the ball screw from FIG. 6.

FIG. 8 shows the situation in which, owing to an elastic deformation of the brake caliper 3 or of the housing-like portion 6, the support disk 33 is tilted relative to the threaded spindle in 28 by an angle α of approximately 0.5°, wherein in the illustration, said tilt is illustrated on an exaggerated scale. Undesired loading of the axial bearing 25 with a bending moment is accordingly prevented. The support disk 33 is accordingly arranged on the threaded spindle 28 so as to be capable of performing a wobbling motion; said support disk can tilt about axes perpendicular to the spindle axis, and can transfer torques for the transmission of torques between support disk 33 and threaded spindle 28.

Figure 9A:
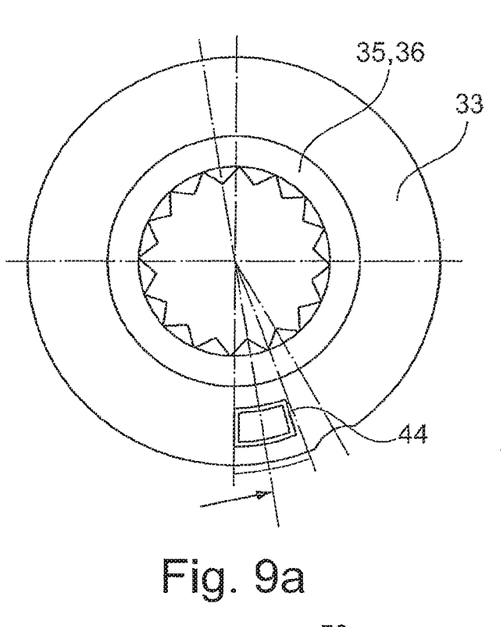
FIG. 9 shows a further individual part of the ball screw from FIG. 6.
Figure 9B:
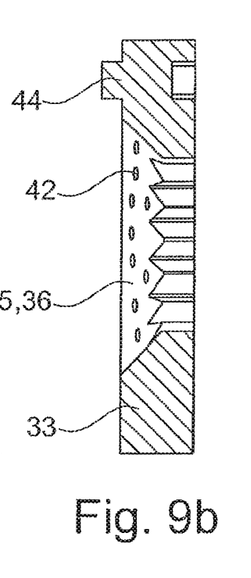
Figure 9C:
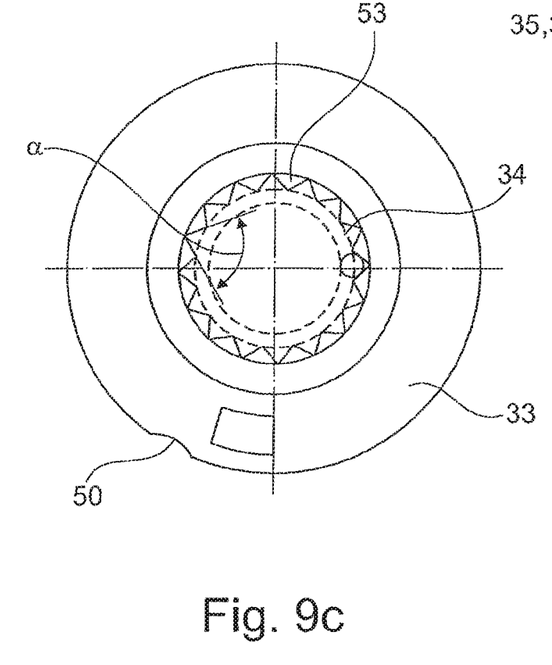

FIGS. 9a, 9b, 9c show the support disk 33 in two views and in longitudinal section. In FIG. 9b, pockets 42 for receiving lubricant are provided in the wall of the conical opening 35. A lubricating film is thus built up in the contact path 37, which lubricating film promotes free-moving tilting of the two bearing surfaces 32, 36.

Figure 10:
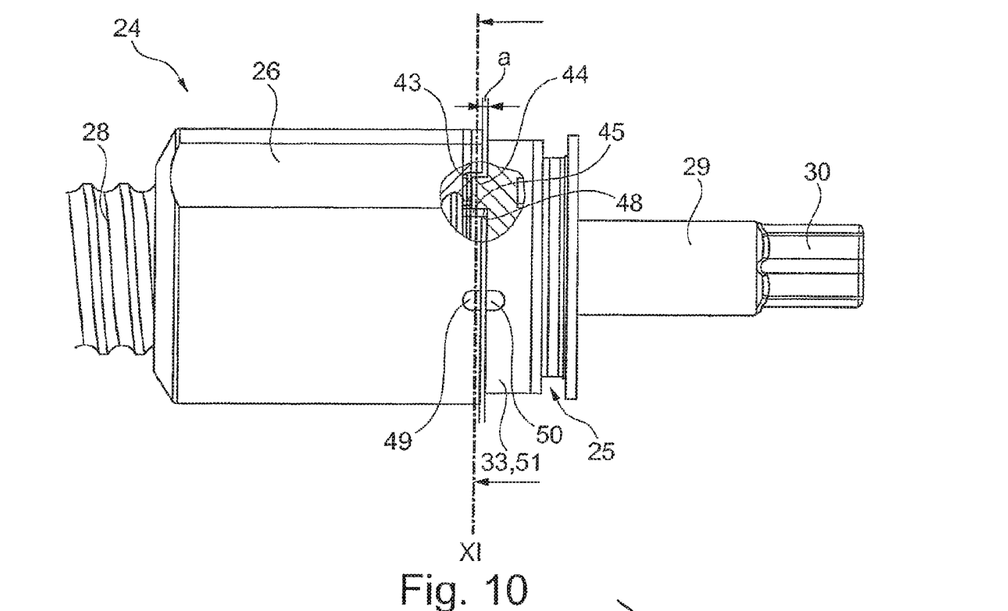
FIG. 10 shows the ball screw according to the invention in a partially cut-away illustration.

FIG. 10 shows the ball screw according to the invention, with threaded nut 26 and support disk 33 illustrated in partially cut-away form. Here, it is possible to see a circumferential stop 43 for the threaded nut 26, which stop will be described in more detail below.

It can be seen from FIG. 10 that the support disk 33 is provided, on its end side facing toward the threaded nut 26, with an axial projection 44. Said axial projection 44 engages into a recess 45 of the threaded nut 26.

Figure 11:
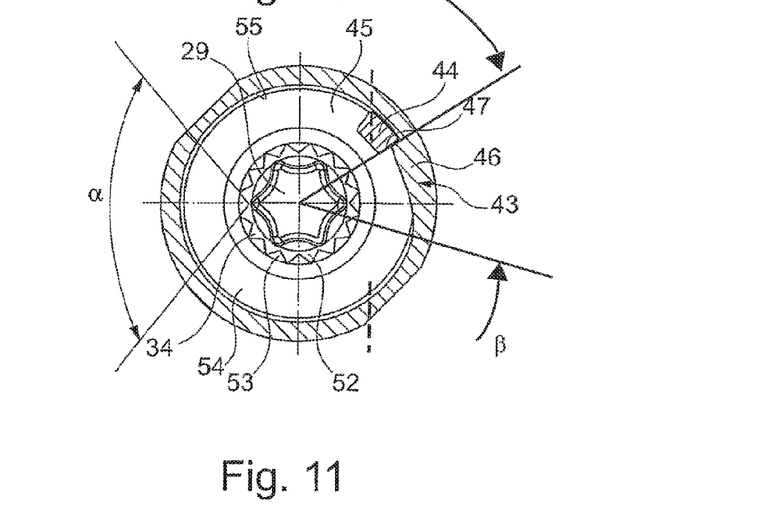
FIG. 11 shows the ball screw according to the invention from FIG. 10 in cross section along the section line XI-XI.

FIG. 11 clearly shows the recess 45, which extends in the circumferential direction over a relatively large circumferential segment β. In one circumferential direction, the recess 45 is delimited by a tooth 46 which is integrally formed on the threaded nut 26 and which is directed radially inward. It can also be seen from FIG. 11 that the projection 44 is arranged in a stop position in which it abuts against a first stop surface 47 of the tooth 46.

In the axial direction, the recess 45 is delimited by a base 54 formed in one piece with the threaded nut 26. The recess is delimited in the radial direction by a circumferential wall 55 formed in one piece with the threaded nut 26.

Said stop 43 prevents the threaded nut 26 from being able to be clamped axially to the support disk 33. This is because, before end surfaces, which face toward one another, of the threaded nut 26 and of the support disk 33 come into contact with one another, the projection 44 abuts against the first stop surface 47 of the tooth 46.

The recess 45 extends over a circumferential angle of greater than 180°, such that the projection 44, upon a screw-type relative rotation with respect to the threaded nut 26, protrudes into said recess 45.

The circumferential stop 43 is designed such that, in the stop situation, a minimum spacing a is maintained between the threaded nut 26 and the support disk 33, such that at any rate axial clamping between the threaded nut 26 and threaded spindle 28 is prevented. FIG. 10 denotes the minimum spacing a which is provided between the two end surfaces, which face toward one another, of the threaded nut 26 and of the spindle disk 33.

In particular, it can be seen from FIG. 10 that the projection 44 and the first stop surface 47 overlap one another in the axial direction. Said axial overlap is on the one hand smaller than the overall axial extent of the axial projection 44, such that in any case, the abovementioned minimum spacing a is ensured. On the other hand, said axial overlap is larger than the axial extent of the projection 44 minus the axial minimum spacing a between the stop 43 and the threaded nut 26. Furthermore, the axial extent of the projection 44 is at most as large as the pitch of the ball screw in order to keep the bending moments acting on the projection 44 low at the instant of abutment against the first stop surface 47.

To prevent radial forces being generated owing to the abutment in the stop situation, in the stop position, a second stop surface 48 formed on the projection 44 and the associated first stop surface 47 of the tooth 46 are arranged in a common plane which contains the spindle axis.

The recess 45, which in the exemplary embodiment is formed on the end side of the threaded nut 26, extends in the circumferential direction over an angle formed from a quotient of the ratio of the abovementioned axial overlap to the pitch of the threaded spindle, multiplied by 360°, wherein to determine the angle, the axial overlap and the pitch of the threaded spindle are both designated using the same unit of length.

It can also be seen from FIG. 10 that in each case one optical marking 49, 50 is formed on the threaded nut 26 and on the support disk 33. Here, said markings 49, 50 are small depressions formed on the outer circumference. Said markings 49, 50 permit simple assembly of the ball screw 24, as will be explained in more detail below.

For correct functioning of the stop 43, the rotational position of the support disk 33 with respect to the threaded spindle 28 is of significance. For example, if, in the exemplary embodiment, the support disk 33 were arranged rotated counterclockwise about the threaded spindle by 90°, a situation could arise in which the threaded nut 26 and the support disk 33 abut against one another at the end side before the stop 43 has taken effect in the circumferential direction. Accordingly, correct rotational positioning of a stop part 51 with respect to the threaded spindle 28 is of significance. In the exemplary embodiment, the stop part 51 is formed by the support disk 33.

It can be seen from FIG. 11 that the toothing 34, already mentioned further above, between the support disk 33 and the spindle portion 29 of the threaded spindle 28 is provided for transmitting torques. Said toothing 34 allows the support disk 33 to be placed onto the spindle portion 29 in a plurality of rotational positions. Said toothing 34 is formed here by an external toothing 52 on the outer circumference of the spindle portion 29 and by an internal toothing 53 on the inner circumference of the support disk 33.

A tooth flank angle a of the external toothing 52 or of the internal toothing 53 is designed to be as small as possible, such that the steepest possible tooth flanks are formed. Steep tooth flanks facilitate the tilting mobility, described further above, of the support disk 33 with respect to the threaded spindle 28. The finer the toothing, the more rotational positions can be set.

For assembly of the ball screw 24, the threaded nut 26 may firstly be screwed onto the threaded spindle 28 until the threaded nut 26 has reached its intended stop position. The support disk 33 may then be placed onto the spindle portion 29 and rotated relative to the threaded spindle 28 and the threaded nut 26 until the two markings 49, 50 are arranged in alignment with one another. The support disk 33 may then be pushed axially further in the direction of the threaded nut 26, wherein the internal toothing 53 engages into the external toothing 52. It is also conceivable for two markings to be provided for example on the support disk 33, between which the marking 49 of the threaded nut 26 should be arranged. In this way, an angle is defined within which an admissible rotational position for the support disk 33 relative to the threaded spindle 28 is provided.

The assembly depicted here may take place in an automated fashion, wherein the markings 49, 50 can be detected by means of suitable measurement sensors. When said markings 49, 50 are in alignment with one another, by means of suitable control, the next assembly step can be triggered and the support disk 33 can be pushed with its internal toothing 53 onto the external toothing 52 of the spindle portion 29.

The ball screw may be formed without a ball return facility. This means that the balls are arranged in a non-endless ball channel and can merely roll back and forth between the ends of said ball channel. In the exemplary embodiment, a helical compression spring may be inserted into the ball channel, one end of which spring is supported against the tooth 46 and the other end of which spring is loaded against the final ball. During load-free ball screw operation, all the balls can be spring-loaded in the direction of the end of the ball channel under the action of a spring force of the helical compression spring. Alternatively, a ball screw may also be used which has, as is known, a ball return facility: the balls circulate in a continuous manner in endless ball channels. The ball channel is formed from a load portion, in which the balls roll under load on ball grooves of the threaded nut and of the threaded spindle, and a return portion, in which the balls are returned from an end to a beginning of the load portion. The return portion may be formed, in a known way, by a diverting pipe on the outer circumference of the threaded nut, or else by diverting pieces which are inserted in the wall of the threaded nut. Said diverting pieces connect an end of a common winding of the load portion to the beginning thereof.

In the exemplary embodiment, the threaded nut 26 with the recess 45 and the tooth 46 is formed from a case-hardened steel in the semi-hot state. Semi-hot forming is carried out in a temperature range from 750° C. to 950° C. For semi-hot forming, prefabricated untreated parts may be inductively heated and formed on partially multi-stage presses.

Here, the ball groove is produced in a cutting process by turning. Alternatively or in addition, the ball groove may also be produced by thread rolling. The finished threaded nut is subsequently case-hardened.

The support disk 33 is likewise produced in a non-cutting process, in particular in the semi-hot forming process. It can be seen in particular from FIG. 9 that the axial projection is approximately half pushed through. This means that material of the support disk 33 is formed out of the disk-shaped part, wherein the support disk 33 is provided, on its end side facing away from the projection, with a cavity.

A method for producing a threaded nut of a ball screw, which can be produced economically in particular in large quantities, is explained in detail below.

Figure 12:
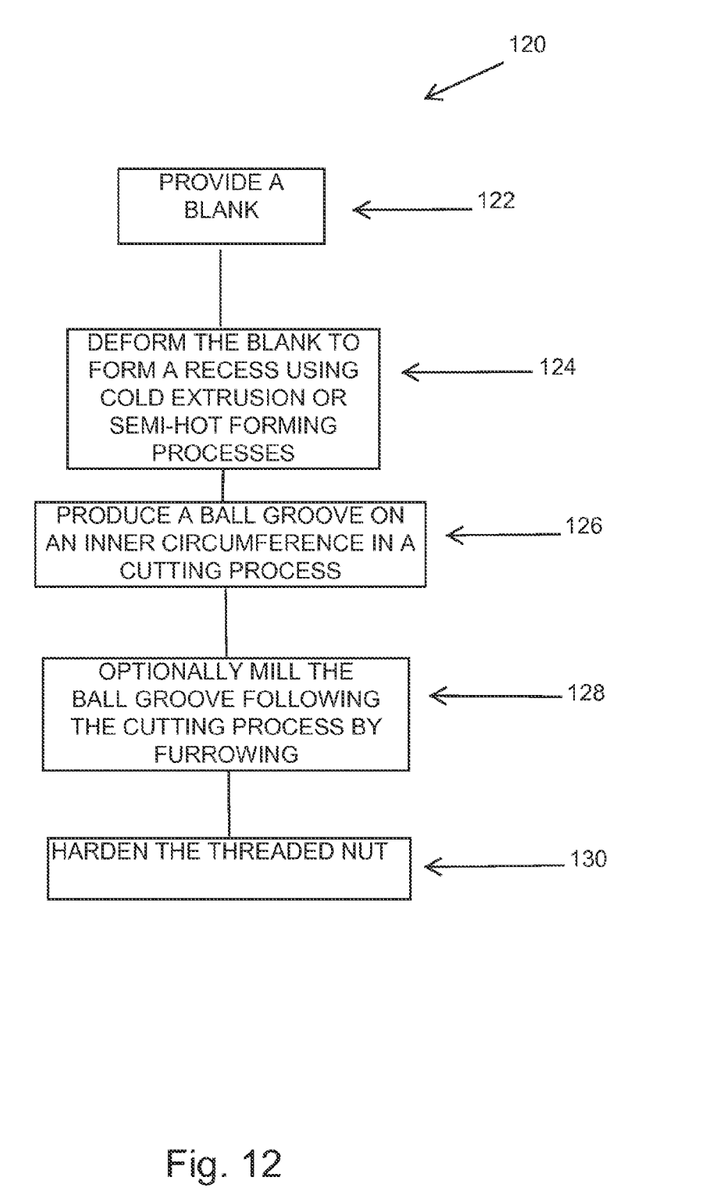
FIG. 12 depicts a flow diagram in accordance with an embodiment of the present invention.

The method according to the invention shown in FIG. 12 as 120. The process begins at 122 where a blank is provided. The method according to the invention for producing a threaded nut of a screw drive, in particular of a ball screw, provides that, on one axial end of the threaded nut, there is formed a recess which extends over a circumferential segment and which is open at the end side, wherein said recess is delimited radially by a circumferential wall of the threaded nut, and wherein said recess is delimited axially by a base formed on the threaded nut, and wherein said recess is delimited in the circumferential direction by a stop surface, which is formed on the threaded nut, for a projection. According to the invention, said threaded nut 26 is produced according to the following steps: a blank is deformed in a deformation process at 124 by deformation of material so as to form the recess 45, wherein the base 54 and the stop surface 47 and the circumferential wall 55 are integrally connected to one another.

The stop surface 47 is expediently formed within the threaded nut 26. Pins or other additional components on which the stop surface is formed are dispensed with. The recess 45 is provided with an integral wall. The non-cutting deformation process 124 which is provided according to the invention for producing the recess 45 offers economic advantages in particular in the case of large quantities owing to the short processing time.

As a result of the deformation, material flows so as to form the wall 55 of the recess 45. For this purpose, said deformation process may take place in a die.

Cold extrusion is particularly suitable for the invention. According to DIN 8583, extrusion falls within the category of pressure forming. Massive forming permits the production of hollow and solid bodies by means of a single-stage or multi-stage production process. In said method, the material is caused to flow under the action of a high pressure. Here, a punch presses the workpiece blank through a die. According to the invention, it is possible in this way to produce the threaded nut 26 with the recess 45.

Proposed as a further deformation variant preferred according to the invention is semi-hot forming. Semi-hot forming is carried out in a temperature range from 600° C. to 950° C. Semi-hot forming is characterized by high dimensional accuracy and surface quality, similarly to cold forming. Semi-hot forming permits the production of complex geometries, wherein the deformation forces can be lowered in relation to cold forming. Semi-hot forming is similar to a forging process and offers the advantages both of cold forming and also of hot forming.

Semi-hot forming permits very low material usage with a reduction in the further machining costs for complex geometries. For semi-hot forming, the prefabricated blanks may be inductively heated and deformed on vertical, in part multi-stage presses. In the method according to the invention, a solid blank may be inserted into a die and deformed therein; a punch may penetrate into the material of the blank; the displaced material flows under the acting forces against the negative form of the die, and takes on the form of the threaded nut according to the invention. The tubular form of the threaded nut 26 can be generated already by the penetration of the punch into the solid blank.

The threaded nut 26 produced in the manner according to the invention has, owing to its production, a very precisely manufactured stop surface 47. High dimensional accuracy for the stop surface 47 is required in particular in connection with a circumferential stop 43 for the threaded nut 26. This is because the axial overlap of the stop surface 47 with a counterpart surface on a projection which engages into the threaded nut is dependent inter alia on the pitch of the threaded spindle, and may amount to only 1 mm or less. This means that the production tolerances on the stop surfaces 47 should be very narrow and the contour should be formed with high precision.

Semi-hot forming meets these requirements. This is because in particular the formation of the stop surface 47 can take place with high accuracy, wherein on account of the flow of the material, very small radii can be obtained at the edges of the stop surface. Small radii offer the advantage that the stop surface 47 is available substantially without losses as a load-bearing surface.

In a further method step, at 126, a ball groove on which balls can roll may be produced, preferably by turning, on the inner circumference of the threaded nut. By the classification of production processes according to DIN 8580, turning falls within the category of cutting processes. In the case of thread turning, a tool is utilized in the longitudinal turning process. The feed may correspond to the thread pitch, the tool thereby leaving behind a track on the desired helical line. The ball groove can be produced after turning machining has been carried out repeatedly.

Thread chasing may be regarded as being a subcategory of thread turning. A tool for thread chasing has a plurality of cutting edges one behind the other. Each has the profile of the thread, and the spacing of the cutting edges corresponds to the pitch. The cutting edges are arranged with an offset, such that each runs slightly deeper in the track of its predecessor. For thread chasing, only a single pass is required, and the processing time can therefore be shortened considerably in relation to thread turning.

For an improvement in surface quality, it may be expedient to carry out so-called furrowing of the ball groove at 128 after the turning process. A type of screw is used as a tool for thread furrowing. As the screw is turned into the bore, a ball groove is furrowed into the material. Here, material is displaced in the bore of the workpiece, which material flows into the thread of the furrowing screw. No chips are formed, and improved strength of the ball groove can be obtained.

Tempering steels and case-hardening steels are expediently suitable for the method according to the invention. Case-hardening steels are easily deformable by extrusion—cold or semi-hot—owing to their low carbon content. After the shaping process, the threaded nut produced according to the invention may be hardened at 130 in a known way; in the case of case-hardening steel, case hardening is carried out.

Case hardening is to be understood to mean the carburization, hardening and annealing of a workpiece composed of steel with the aim of obtaining an increase in wear resistance by means of an increased surface layer hardness, obtaining an increase in load-bearing capacity, obtaining an improvement in bending strength by means of a ductile core, and obtaining an increase in fatigue strength.

List of Reference Symbols
1 Brake device
2 Brake disk
3 Brake caliper
4 Brake pad
5 Brake pad
6 Housing-like portion
7 Ball screw
8 Threaded spindle
9 Balls
10 Threaded nut
11 Ball return element
12 Radial bearing
13 Axial bearing
14 Piston
15 Conical guide surface
16 Guide surface
17 Wall
18 First bearing disk
19 Second bearing disk
20 Needle rolling bodies
21 Axial projection
22 Second bearing surface
23 First bearing surface
24 Ball screw
25 Axial bearing
26 Threaded nut
27 Ball
28 Threaded spindle
29 Spindle portion
30 Polygon
31 Shoulder
32 First bearing surface
33 Support disk
34 Toothing
35 Conical opening
36 Second bearing surface
37 Contact path
38 Axial rolling bearing
39 Roller
40 Bearing disk
41 Bearing disk
42 Pocket
43 Stop
44 Projection
45 Recess
46 Tooth
47 First stop surface
48 Second stop surface
49 Marking
50 Marking
51 Stop part
52 External toothing
53 Internal toothing
54 Base
55 Circumferential wall
A Common axis
$A_1$ Axis of the brake caliper
$A_2$ Axis of the ball screw
$A_3$ Axis of the piston
R1 Radius of curvature of the first bearing surface
R2 Radius of the contact path
S Spindle axis

The invention claimed is:

1. A method for producing a threaded nut of a screw drive, the threaded nut has, on one axial end, a recess which extends over a circumferential segment and which is open at an end, said recess is delimited radially by a circumferential wall of the threaded nut, and said recess is delimited axially by a base formed on the threaded nut, and said recess is delimited in a circumferential direction by a stop surface which is formed on the threaded nut, for a projection, the threaded nut being produced according to the following steps:

deforming a blank in a deformation process by deformation of material so as to form the recess, with the base and the stop surface and the circumferential wall being integrally connected to one another.

2. The method for producing a threaded nut of a ball screw as claimed in claim 1, wherein the blank is deformed by a cold extrusion process.

3. The method for producing a threaded nut of a ball screw as claimed in claim 1, wherein the blank is deformed in a semi-hot state at temperatures between 600° C. and 950° C.

4. The method for producing a threaded nut of a ball screw as claimed in claim 1, further comprising, forming on an inner circumference of the threaded nut a helical ball groove about an axis in a cutting process by turning.

5. The method for producing a threaded nut of a ball screw as claimed in claim 4, wherein after the turning process, additionally machining the ball groove by furrowing.

6. The method for producing a threaded nut of a ball screw as claimed in claim 1, wherein subsequently to the deformation process and the production of the ball groove, hardening the threaded nut.

* * * * *